(12) United States Patent
Mardall et al.

(10) Patent No.: US 9,527,403 B2
(45) Date of Patent: Dec. 27, 2016

(54) CHARGING STATION PROVIDING THERMAL CONDITIONING OF ELECTRIC VEHICLE DURING CHARGING SESSION

(71) Applicant: Tesla Motors, Inc., Palo Alto, CA (US)

(72) Inventors: Joseph Mardall, San Francisco, CA (US); Christopher H. Van Dyke, San Francisco, CA (US)

(73) Assignee: Tesla Motors, Inc., Palo Alto, CA (US)

( * ) Notice: Subject to any disclaimer, the term of this patent is extended or adjusted under 35 U.S.C. 154(b) by 54 days.

(21) Appl. No.: 14/264,364

(22) Filed: Apr. 29, 2014

(65) Prior Publication Data

US 2015/0306974 A1    Oct. 29, 2015

(51) Int. Cl.
  *H02J 7/04* (2006.01)
  *B60L 11/18* (2006.01)
  *H01M 10/625* (2014.01)
  *H01M 10/656* (2014.01)
  *H01M 10/44* (2006.01)

(52) U.S. Cl.
  CPC ........ *B60L 11/1874* (2013.01); *B60L 11/1816* (2013.01); *B60L 11/1875* (2013.01); *H01M 10/625* (2015.04); *H01M 10/656* (2015.04); *B60L 11/1877* (2013.01); *H01M 10/443* (2013.01); *H01M 2220/20* (2013.01)

(58) Field of Classification Search
  CPC .............. B60L 11/1874; B60L 11/1875; B60L 11/1816; B60L 11/185; B60L 2240/545; B60L 2240/36; H01M 10/6567; H01M 10/625; H01M 2220/20; Y02T 10/7088
  USPC .......................................... 320/109, 150, 153
  See application file for complete search history.

(56) References Cited

U.S. PATENT DOCUMENTS

| | | | | |
|---|---|---|---|---|
| 5,202,617 | A * | 4/1993 | Nor | B60L 3/12 320/109 |
| 5,306,999 | A | 4/1994 | Hoffman | |
| 5,395,708 | A | 3/1995 | Hall | |
| 5,548,200 | A * | 8/1996 | Nor | B60L 11/184 320/106 |
| 5,583,418 | A * | 12/1996 | Honda | B60L 11/1825 320/106 |
| 6,054,838 | A * | 4/2000 | Tsatsis | B60K 6/12 180/165 |
| 7,633,265 | B2 * | 12/2009 | Matsushima | H02J 7/00 320/133 |
| 8,294,420 | B2 * | 10/2012 | Kocher | B60L 11/1816 320/107 |
| 8,890,475 | B1 * | 11/2014 | Becker | B60L 11/1827 180/65.29 |
| 8,963,494 | B2 * | 2/2015 | Kishiyama | H02J 7/0027 320/103 |
| 9,197,091 | B2 * | 11/2015 | Kishiyama | H02J 7/0027 |
| 9,348,381 | B2 * | 5/2016 | Khoo | B60L 11/1825 |

(Continued)

*Primary Examiner* — Helen Rossoshek
(74) *Attorney, Agent, or Firm* — Garlick & Markison; Bruce E. Garlick

(57) ABSTRACT

A method of thermally conditioning an energy storage of a vehicle while charging includes: receiving, at a charging station, thermal information about the energy storage; supplying, by the charging station, electric energy to the energy storage in a charging session; and providing, by the charging station and based on the thermal information, thermal conditioning of the energy storage during at least part of the charging session.

19 Claims, 13 Drawing Sheets

(56) References Cited

U.S. PATENT DOCUMENTS

| | | | |
|---|---|---|---|
| 2003/0120442 A1* | 6/2003 | Pellegrino | B60L 11/1816 702/60 |
| 2009/0115251 A1* | 5/2009 | Nakamura | B60K 6/445 307/32 |
| 2009/0200987 A1 | 8/2009 | Saito et al. | |
| 2011/0012562 A1 | 1/2011 | Paryani | |
| 2011/0050167 A1* | 3/2011 | Kissel, Jr. | B60L 3/0046 320/109 |
| 2011/0156661 A1 | 6/2011 | Mehta et al. | |
| 2011/0298417 A1 | 12/2011 | Stewart et al. | |
| 2012/0041855 A1* | 2/2012 | Sterling | B60L 3/0046 705/34 |
| 2012/0074901 A1* | 3/2012 | Mohammed | B60L 11/1842 320/109 |
| 2012/0101659 A1* | 4/2012 | Kim | B60H 1/00257 701/2 |
| 2012/0119702 A1* | 5/2012 | Gaul | B60L 3/0069 320/109 |
| 2012/0181973 A1* | 7/2012 | Lyden | B60L 11/182 320/101 |
| 2013/0024306 A1* | 1/2013 | Shah | G06Q 20/32 705/17 |
| 2013/0193918 A1* | 8/2013 | Sarkar | B60L 3/04 320/109 |
| 2013/0234648 A1 | 9/2013 | Kelty et al. | |
| 2013/0257373 A1* | 10/2013 | Mallon, IV | B60L 11/1824 320/109 |
| 2013/0307475 A1* | 11/2013 | Kishiyama | H02J 7/0027 320/109 |
| 2013/0307477 A1* | 11/2013 | Reinschke | B60L 11/1816 320/109 |
| 2014/0055090 A1* | 2/2014 | Krause | B60L 11/182 320/108 |
| 2014/0062397 A1* | 3/2014 | Dyer | B60L 1/003 320/109 |
| 2014/0070767 A1* | 3/2014 | Morris | B60L 5/42 320/109 |
| 2014/0121866 A1* | 5/2014 | Dangler | H02J 7/007 701/22 |
| 2014/0148965 A1* | 5/2014 | Epstein | B60L 11/1825 700/297 |
| 2014/0193683 A1 | 7/2014 | Mardall et al. | |
| 2014/0316630 A1* | 10/2014 | Kohlberger | B60L 1/003 701/22 |
| 2014/0333261 A1* | 11/2014 | Oh | B60L 11/1827 320/109 |
| 2015/0054460 A1* | 2/2015 | Epstein | B60L 11/187 320/109 |
| 2015/0321570 A1* | 11/2015 | Cun | B60L 11/1803 705/34 |
| 2015/0372717 A1* | 12/2015 | Schrum, Jr. | H04B 3/542 370/458 |

* cited by examiner

CHARGING STATION PROVIDING THERMAL CONDITIONING OF ELECTRIC VEHICLE DURING CHARGING SESSION

BACKGROUND

Electric vehicles depend on being recharged with electric energy at regular intervals. Energy storages in such vehicles (e.g., lithium-ion battery packs) typically accept direct current (DC) power for recharging. Some charging stations provide a supply of DC that typically plugs into the vehicle by way of a cable. Some electric vehicles have onboard chargers that convert alternating current (AC) to DC and these vehicles can therefore accept a supply of AC, such as from an outlet in the vehicle owner's home or at another location.

Battery packs generate heat during use, both when charging and when power is being drawn from the cells (e.g., to power an electric motor). For this reason, battery packs typically have some form of cooling system. In the case of electric vehicles, this is an onboard cooling system that removes heat from the battery pack (e.g., by way of a coolant loop in between the cells). The removed heat is then generally released into the atmosphere, for example by way of a radiator, a condenser, and/or a chiller.

SUMMARY

In a first aspect, a method of thermally conditioning an energy storage of a vehicle while charging includes: receiving, at a charging station, thermal information about the energy storage; supplying, by the charging station, electric energy to the energy storage in a charging session; and providing, by the charging station and based on the thermal information, thermal conditioning of the energy storage during at least part of the charging session.

Implementations can include any or all of the following features. The method further includes actuating an arm so that an electric connector and a fluid connector mounted thereon make contact with the vehicle, wherein the electric energy is supplied to the energy storage through the electric connector, and wherein the thermal conditioning of the energy storage is provided through the fluid connector. Actuating the arm comprises guiding the arm to a position underneath the vehicle. Actuating the arm comprises coupling the electric connector to an electric port on the vehicle, and coupling the fluid connector to a fluid port on the vehicle. Coupling the fluid connector to the fluid port comprises coupling the fluid connector to a thermal system of the vehicle, the method further comprising providing, by the charging station and to the thermal system, a first liquid through the fluid connector, and extracting, by the charging station, a second liquid from the thermal system. The method further includes actuating an arm so that a thermal contactor mounted thereon enters through an opening in the energy storage and contacts a thermal exchange plate inside the energy storage. The method further includes actuating an arm so that an air inlet couples with an air intake on the energy storage, wherein providing the thermal conditioning comprises feeding air into the energy storage through the air intake. Providing the thermal conditioning comprises directing one or more conditioned jets of fluid at the vehicle. The method further includes selecting a thermal mode from at least a cooling mode and a heating mode based on the thermal information, wherein the thermal conditioning corresponds to the selected thermal mode. The thermal information comprises a temperature value specified by the energy storage, and wherein the thermal mode is selected according to the temperature value. The temperature value reflects a fluid temperature requested by the energy storage, and wherein providing the thermal conditioning comprises supplying fluid having the requested fluid temperature to the vehicle. Providing the thermal conditioning comprises contacting the energy storage with a conductive pad during the charging session, and circulating a fluid through the conductive pad. The method further includes guiding the vehicle into position at the charging station using at least one contoured vehicle guide on a ground surface.

In a second aspect, a system includes: charging equipment configured to supply electric energy in a charging session to an energy storage of a vehicle; and means for providing, based on thermal information about the energy storage received from the vehicle, thermal conditioning of the energy storage during at least part of the charging session.

Implementations can include any or all of the following features. The system further includes an actuated arm that the means maneuvers to provide the thermal conditioning. The arm is configured to be maneuvered under the vehicle for the charging session. The arm has an electric connector and a fluid connector mounted thereon, the electric connector configured to couple to an electric port on the vehicle, the fluid connector configured to couple to a fluid port on the vehicle, wherein the charging equipment supplies the electric energy to the energy storage through the electric connector, and wherein the means provides the thermal conditioning of the energy storage through the fluid connector. The system further includes at least one reservoir with a fluid, wherein the means draws from the reservoir to provide the thermal conditioning. The system has a first reservoir with heated liquid and a second reservoir with a cooled liquid, and respective valves coupled to the first and second reservoirs, wherein the means draws an amount of liquid from at least one of the first and second reservoirs according to the thermal information to provide the thermal conditioning.

In a third aspect, a vehicle includes: an energy storage configured to store electric energy for at least propulsion of the vehicle; and a coupling configured to receive thermal conditioning of the energy storage provided by a system external to the vehicle.

Implementations can include any or all of the following features. The vehicle further includes a thermal system for the energy storage, wherein the coupling comprises a liquid-to-liquid heat exchanger configured to provide thermal exchange between a first liquid provided by the system external to the vehicle, and a second liquid in the thermal system. The coupling comprises an air intake on the energy storage, and wherein the thermal conditioning provided by the system external to the vehicle comprises air being fed into the energy storage through the air intake.

DETAILED DESCRIPTION

This document describes examples of systems and techniques that provide thermal conditioning of an electric vehicle during a charging session. For example, the charging of an electric vehicle can generate significant heat in the battery pack (especially in a fast charging mode), and external cooling can then be provided to maintain the battery pack within an acceptable temperature range during the charging session. As another example, some charging procedures may require the battery pack to initially have at least a minimum temperature, and an external system for warming the battery pack can then be provided. Also, as charging rates increase, the cooling needs during charging will exceed the cooling needs during driving, which means off board cooling becomes more advantageous. For simplicity, the following description sometimes uses the term "coolant" to describe a fluid that is circulated through a system to provide thermal conditioning, with the understanding that such a fluid can be used to either extract thermal energy from the system (i.e., cool the system) or add thermal energy to the system (i.e., heat the system), depending on the circumstances.

Figure 1:
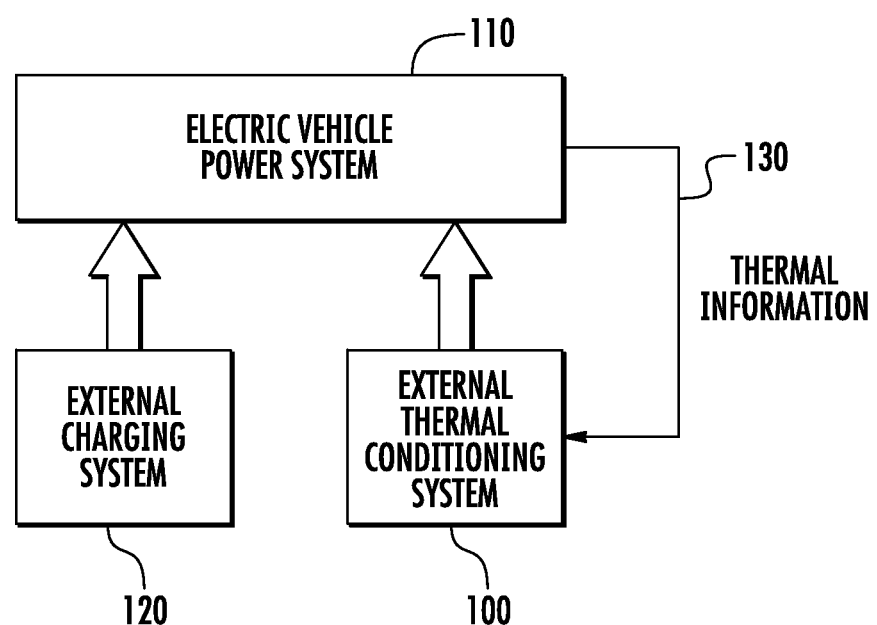
FIG. 1 schematically shows an external thermal conditioning system that provides thermal conditioning of an electric vehicle power system during a charging session performed by an external charging system.

FIG. 1 schematically shows an external thermal conditioning system 100 that provides thermal conditioning of an electric vehicle power system 110 during a charging session performed by an external charging system 120. In some implementations, the power system 110 is part of an electric vehicle (e.g., a plug-in electric vehicle or a plug-in hybrid). For example, the electric vehicle has a battery pack that provides propulsion energy to an electric motor (e.g., via an inverter or other power electronics), and that can be replenished by the external charging system 120 (e.g., by a DC connection, or by way of an onboard charger).

The vehicle generates thermal information 130 that reflects the current need for thermal conditioning of the vehicle's energy storage (e.g., battery pack). The vehicle's energy storage can be configured so that it communicates the temperature of coolant that it needs at a given moment. That is, the energy storage can determine its own need for thermal conditioning and then specify a corresponding temperature value. In situations where the external thermal conditioning system 100 is not present (e.g., while the vehicle is being driven), this thermal information can trigger the vehicle's onboard cooling system to supply coolant of an appropriate temperature.

On the other hand, when the external thermal conditioning system 100 is available to the vehicle (e.g., at a charging station), the thermal information can also (or instead) be provided to the external thermal conditioning system, which can then use that information in providing thermal conditioning. For example, the electric vehicle power system 110 can generate a wireless transmission for receipt by the external thermal conditioning system 100. The communication can be transmitted using any suitable standard or protocol, including, but not limited to, via Bluetooth.

Some implementations can use a signaling protocol as follows. An initial signal from the vehicle to the charging station is transmitted by wireless communication (e.g., Bluetooth), and this serves to couple the vehicle to the charging station. In response, the appropriate vehicle-charger connections can be established, including an electrical connection for the charging (and, in some implementations, a fluid connection for thermally conditioning the vehicle during the charging). Then, a temperature demand signal or any other form of thermal information can be sent to the charging station via a signal wire in the electrical connector.

The external thermal conditioning system receives the communication generated by the vehicle and responds to it by providing the appropriate thermal conditioning (e.g., by way of supplying coolant at the specified temperature). In some implementations, the external thermal conditioning system can use a specified temperature value in choosing between available thermal modes. For example, the external thermal conditioning system 100 selects between at least a cooling mode and a heating mode based on the thermal information. External thermal conditioning can be provided as shown with two spate reservoirs and flow streams, or with heating and cooling elements interacting with a single flow stream, or through any standard thermal regulation methodology.

The thermal conditioning can be provided during as much or as little of the charging session as necessary or desired. In some situations, the thermal conditioning can occur solely before any electric energy is fed into the vehicle (e.g., if the battery pack needs to be heated before charging begins). In other situations, the thermal conditioning can begin after some amount of charging has been performed (e.g., to counteract rising heat in the battery pack). In other situations, the thermal conditioning can be performed during the entire charging session.

Figure 2:
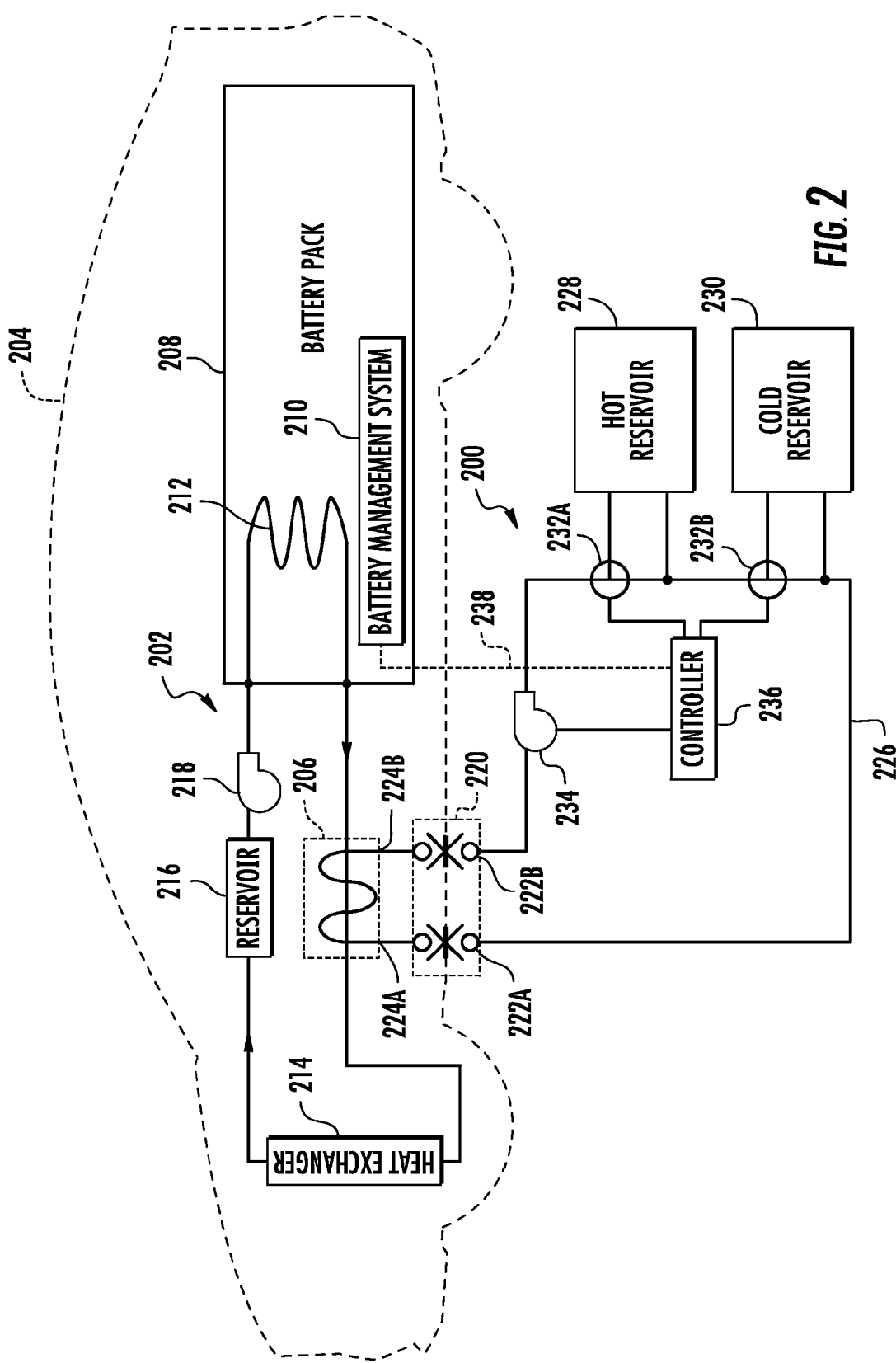
FIG. 2 shows an example of an external thermal conditioning system that interacts with an internal cooling system of an electric vehicle via a heat exchanger.

FIG. 2 shows an example of an external thermal conditioning system 200 that interacts with an internal cooling system 202 of an electric vehicle 204 via a heat exchanger 206. The vehicle has a battery pack 208 (e.g., multiple modules of lithium-ion cells) that is under the control of a battery management system (BMS) 210. For example, the BMS can monitor the state-of-charge and/or other characteristics of the battery pack, and can control the charging of energy into the battery as well as extraction of energy therefrom.

The internal cooling system 202 serves to thermally condition the battery pack 208 during operation of the vehicle 204. Here, the internal cooling system includes one or more cooling tubes 212 in thermal contact with the cells of the battery pack 208, a heat exchanger 214 where heat from the coolant is released into the air, a reservoir 216 that holds some of the circulating coolant, and at least one pump 218 that circulates the coolant through the internal cooling system. While the vehicle is being driven, the internal cooling system can continuously remove heat generated by the cells in the battery pack, and by other parts of the vehicle's powertrain (e.g., the electric motor) in order to keep the components at an appropriate working temperature.

The external thermal conditioning system 200 can be coupled to the vehicle 204 by a connector 220. For example, this can be a quick-disconnect fluid coupling. The connector couples a port 222A to an inlet 224A of the heat exchanger 206, and couples a port 222B to an outlet 224B of the heat exchanger. That is, the connector allows fluid to flow between the external thermal conditioning system and the heat exchanger, which in turn is in thermal contact with the coolant of the internal cooling system 202. Here, the connector 220 represents only a connection for fluid between the vehicle and the external system, but in some implementations, a common connector can provide separate connections for fluid and electricity to the vehicle. Such a common connector can also have one or more signal wires to facilitate communication between the vehicle and the charging station. For example, the vehicle can use the signal wire to send thermal information to the charging station for the charging session.

The external thermal conditioning system 200 has a line 226 for circulation of the external coolant. A hot reservoir 228 and a cold reservoir 230 are selectively coupled to the line by respective valves 232A-B (e.g., three-way valves). At least one pump 234 is provided to circulate coolant in the line 226 as needed. The external thermal conditioning system is controlled by a controller 236. For example, the controller can detect whether the connector 220 is currently attached (by way of a sensor on the connector), open the valve 232A or B (or both) to feed coolant into the line, and run the pump to circulate the coolant. A controller can be used in any of the examples described herein (e.g., to receive the thermal information from the vehicle and choose an appropriate thermal conditioning in response), but is not always explicitly shown or discussed for brevity.

In operation, the connector 220 is coupled to the vehicle 204, such as by operation of an automated arm positioned underneath the vehicle. For example, this coupling is done at a charging station where the vehicle is currently being charged, or in preparation for such charging of the vehicle. The internal cooling system 202 can be running at this point, or it can currently be inactive.

A connection 238 can be established between the vehicle 204 and the external thermal conditioning system 200. In some implementations, the BMS 210 generates thermal information about the battery pack 208 and the vehicle then transmits that information as a message over the established connection. For example, a wireless signal can be transmitted, directly or indirectly, for receipt by the controller 236.

The external thermal conditioning system 100 receives the thermal information from the battery pack through the connection 238, and chooses an appropriate thermal mode based on it. Thereafter, the external system begins circulating coolant in the line 226, including through the heat exchanger 206, according to the selected thermal mode. For example, the heat exchanger 206 is a liquid-to-liquid heat exchanger where the coolant from the external system and the coolant of the internal system are in thermal contact with each other, such as by flowing across plates or other surfaces. That is, in this example the external system removes heat from the internal system in order to manage the temperature of the battery pack during charging. In such scenarios, the external system can draw fluid predominantly from the cold reservoir 230 so as to provide the appropriate cooling in the heat exchanger. In other cases, the external system can provide warmer fluid (i.e., from the hot reservoir 228) so as to heat the coolant of the internal system and thereby bring the battery pack up to a temperature suitable for a type of charging that is about to be initiated.

The reservoirs 228 and 230 are maintained within suitable predefined temperature ranges. For example, heating elements can be provided inside or on the outside of the hot reservoir so as to keep the fluid at the correct temperature. This includes re-heating the fluid after some of it is used in heating one or more battery packs. In some implementations, the hot reservoir is active only in those time periods when battery packs are expected to need heating (such as during winter). The cold reservoir 230, in turn, has one or more cooling units to keep the coolant at a specified temperature. Similarly, after or during cooling of one or more battery packs, the cold reservoir can be actively chilled so as to maintain the temperature.

The sizes of the hot and cold reservoirs 228 and 230 are selected based on the expected amount of thermal conditioning they should provide. For example, the two reservoirs 228 and 230 can be installed to serve a charging station that has multiple (e.g., ten) charging spots, and a certain number of vehicles is expected to use the station every day, so the reservoir capacity will be chosen accordingly. Also, the geographical location of the charging station will influence such considerations, in that a hot climate will likely create a demand for cooling all year-round (with perhaps no need for heating), and a cooler climate will need heating and cooling during different seasons.

Some implementations can use another way of regulating the temperature of the external coolant than, or in addition to, the hot and cold reservoirs 228 and 230. For example, an electrical inline heater can be used for heating the flowing coolant. As another example, an inline direct refrigerant cooler can be applied to chill the coolant.

Figure 3:
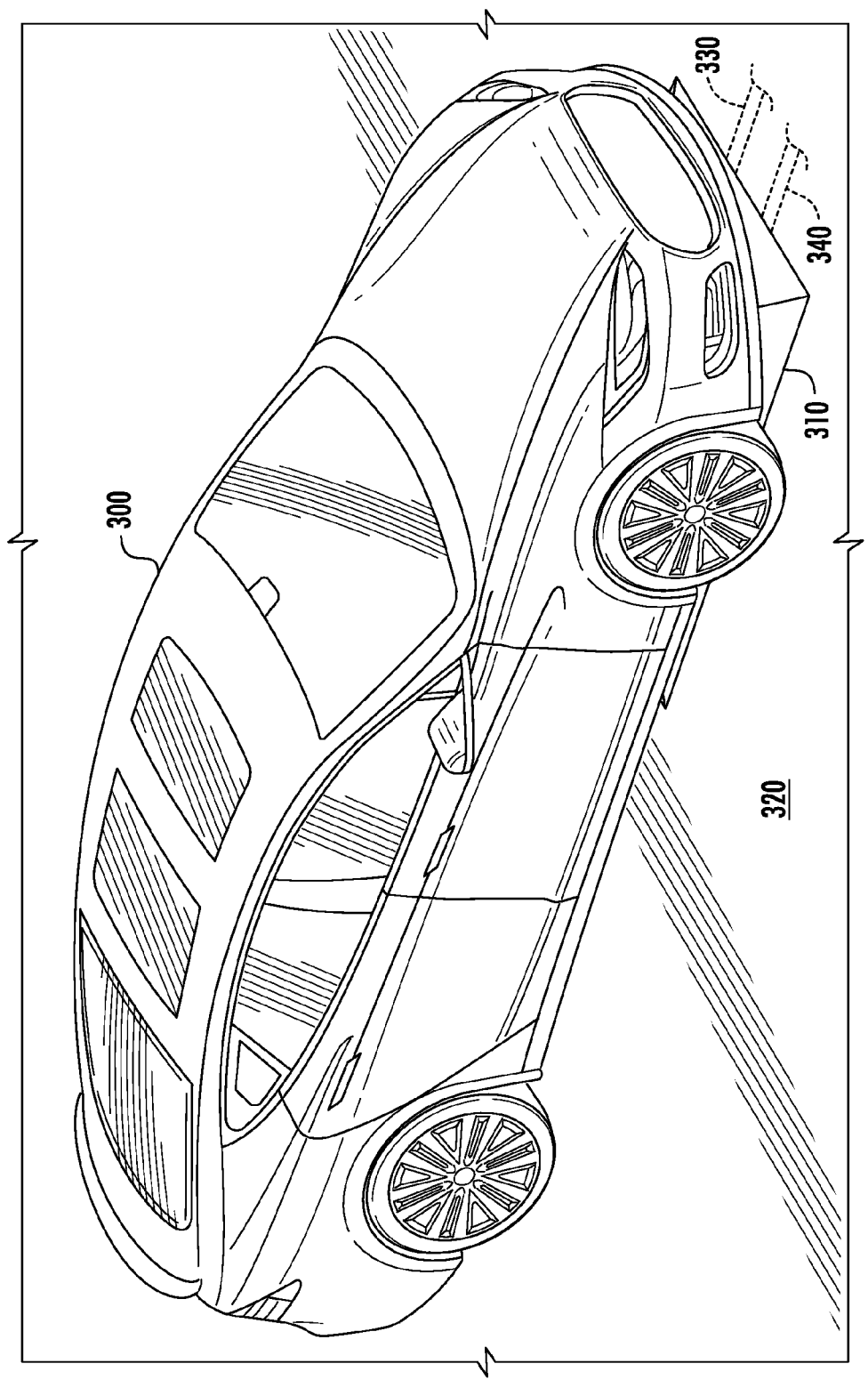
FIG. 3 shows an example of an electric vehicle positioned above an underground system that provides electric charging and thermal conditioning of the electric vehicle.

FIG. 3 shows an example of an electric vehicle 300 positioned above an underground system 310 that provides electric charging and cooling of the electric vehicle. For example, the vehicle can be a plug-in electric vehicle or a plug-in hybrid, both of which need to have its internal energy storage (e.g., a battery pack) recharged from time to time. That is, the vehicle can pull into a designated space 320, such as a dedicated charging station or a reserved spot in a parking lot. By parking the vehicle over the underground system, the driver positions a connector on the vehicle underbody so it can be accessed by a portion of the underground system that extends above the ground surface. In some implementations, the underground equipment has an automatically guided system for making the necessary connections between the vehicle and the charging station. Some examples are described below. The underground system is here configured to provide both electric charging and thermal conditioning of the vehicle and therefore has an electric line 330 that feeds electricity from a remote location to the underground system, and a fluid line 340 that provides at least one line of coolant flow for the underground system.

Figure 4:
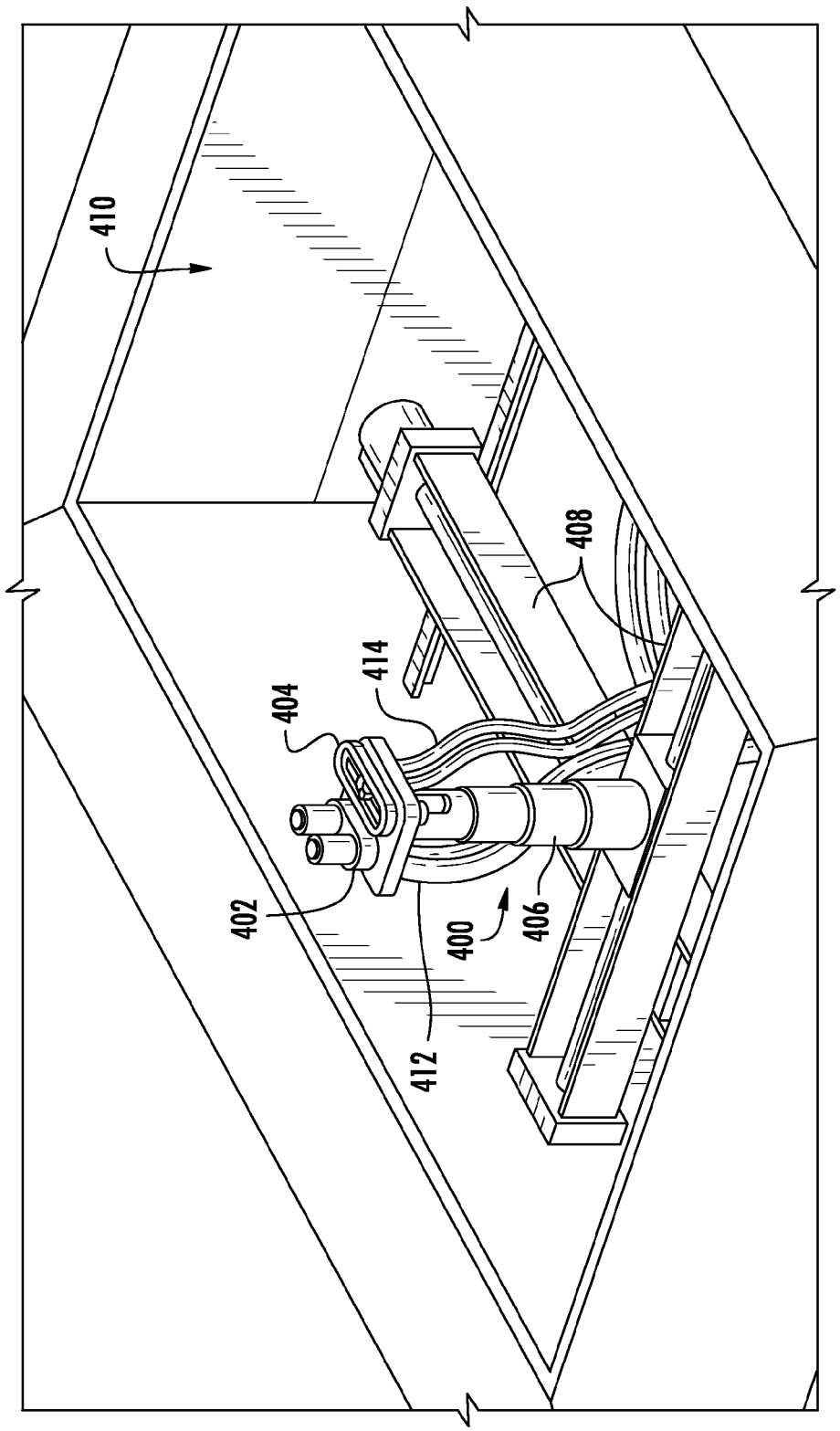
FIG. 4 shows an example of an arm for positioning underneath an electric vehicle, the arm having a fluid connector and an electric connector.

FIG. 4 shows an example of an arm 400 for positioning underneath an electric vehicle, the arm having a fluid connector 402 and an electric connector 404. Here, the arm has a telescopic member 406 that allows the arm to be extended upward (e.g., until the connector couples with a corresponding connector underneath the vehicle) and downward (e.g., to bring the arm below the ground surface when not in use). The arm is moveable to different positions by way of linear actuators 408. For example, one of the linear actuators can orient the arm in a fore/aft position relative to the vehicle, and another linear actuator can orient the arm in a right/left position relative to the vehicle.

The arm 400 and its associated components are here located in a well 410 that is at least partially below ground surface. For example, this can be part of the underground system 300 (FIG. 3). In some implementations, the well can be closed toward the outside when needed. For example, an automated horizontally sliding door normally covers the well when the equipment is not in use, and when a vehicle parks above the well, the door is opened to allow charging and thermal conditioning. After the charging session, the door can be closed before the vehicle pulls away.

The fluid connector 402 is coupled to fluid lines 412 and the electric connector 404 is coupled to electric lines 414. The fluid lines (e.g., flexible tubes) are part of an external thermal conditioning system that circulates coolant to and from the fluid connector. The electric lines (e.g., flexible conduits) are part of an external charging system that provides electric energy for charging an electric vehicle.

In other implementations, the arm 400 and the associated components that control it can instead serve as a pure charging system. For example, the fluid connector 402 and the fluid lines 412 can be omitted or inactive, and the arm can be used to automatically and conveniently charge electric vehicles.

Figure 5:
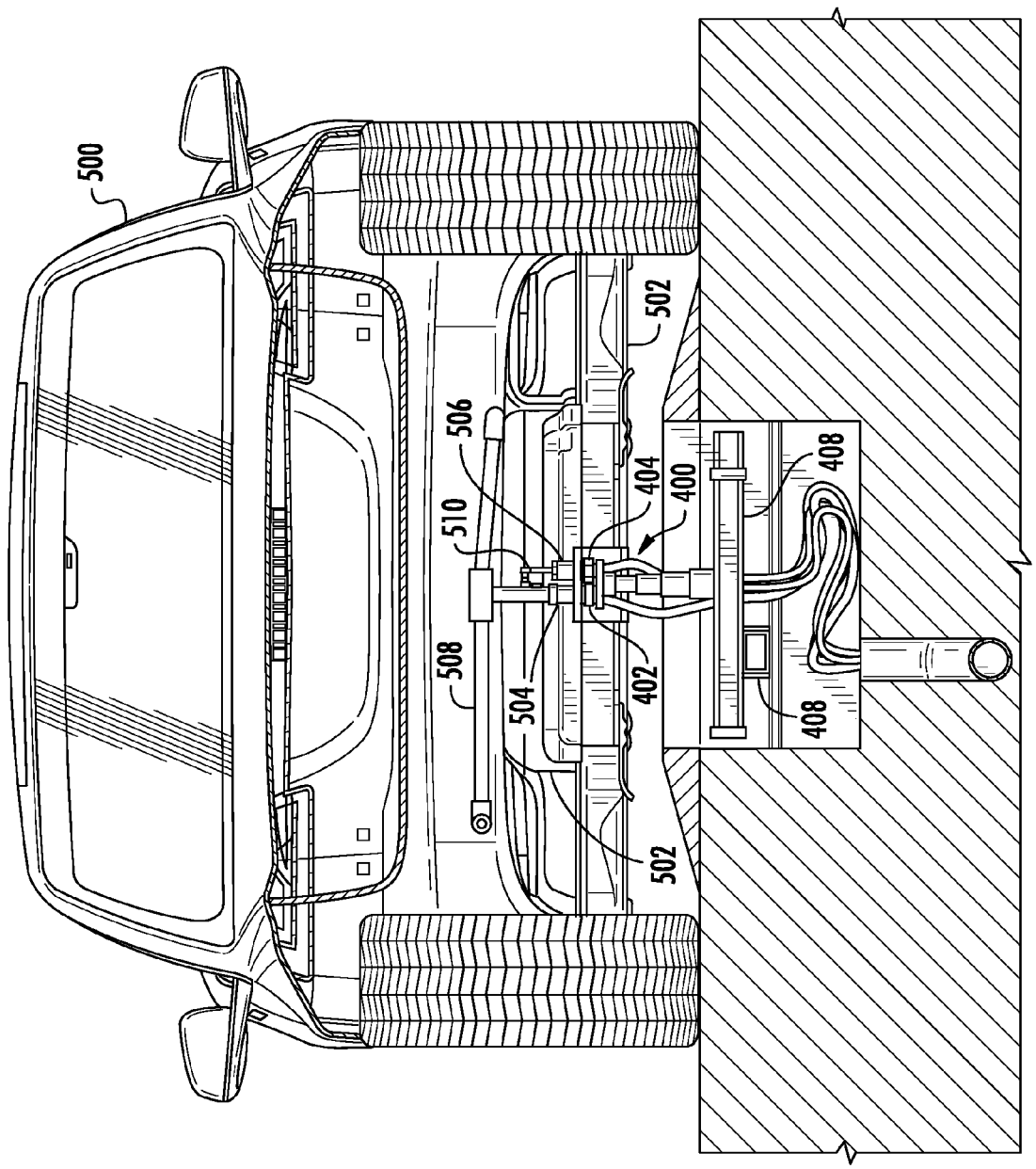
FIG. 5 shows the arm of FIG. 4, wherein the fluid connector and the electric connector are coupled to an electric vehicle.

FIG. 5 shows the arm 400 of FIG. 4, wherein the fluid connector 402 and the electric connector 404 are coupled to an electric vehicle 500. The electric vehicle is here shown in partial cross section, from the front and towards the rear, so as to present a battery pack 502, a fluid connector 504 for the fluid connector 402, an electric connector 506 for the electric connector 404, an internal coolant line 508 coupled to the fluid connector 504, and an electric line 510 coupling the electric connector 404 to the battery pack.

In operation, the arm 400 is positioned with regard to the fluid connector 504 and the electric connector 506 by way of a spatial guiding system. In some implementations, a laser guiding system can be used. For example, the arm can have mounted thereon a light detector and a lens or other optics that provides a laser beam. The reflections of the laser beam from the structures underneath the vehicle (e.g., the connectors 504-06) can then be detected as a way of properly orienting the arm into the correct position for establishing the connection. In some implementations, a camera mounted on or near the arm can capture images of the vehicle underbody, and based on the image capture, the arm can automatically be guided to the correct position. As another example, the camera view can be presented to a human operator who can remotely control the movement of the arm. In other implementations, one or more other approaches for automatic guiding can instead or additionally be used, including, but not limited to: infrared illumination, mechanical locators (e.g., tapered pins), ultraviolet illumination, radar scanning, or optical guidance.

In some implementations, coupling the fluid connector 402 to the fluid connector 504 does not involve tapping into the vehicle's internal cooling system. Rather, the coupling serves to bring the external coolant into a liquid-to-liquid heat exchanger in the vehicle, which heat exchanger in turn provides a thermal interface to the vehicle's internal cooling system. That way, the external coolant can perform thermal conditioning of the internal coolant (and thereby of the battery pack 502) without one having to open (and then close) the internal cooling system to the outside.

In other implementations (e.g., as described below), the coupling of the fluid connector 402 to the fluid connector 504 does provide fluid exchange between the internal and external cooling systems. For example, this allows the external system to draw existing coolant out from the internal system and replace it with properly tempered coolant from an external reservoir.

Figure 6:
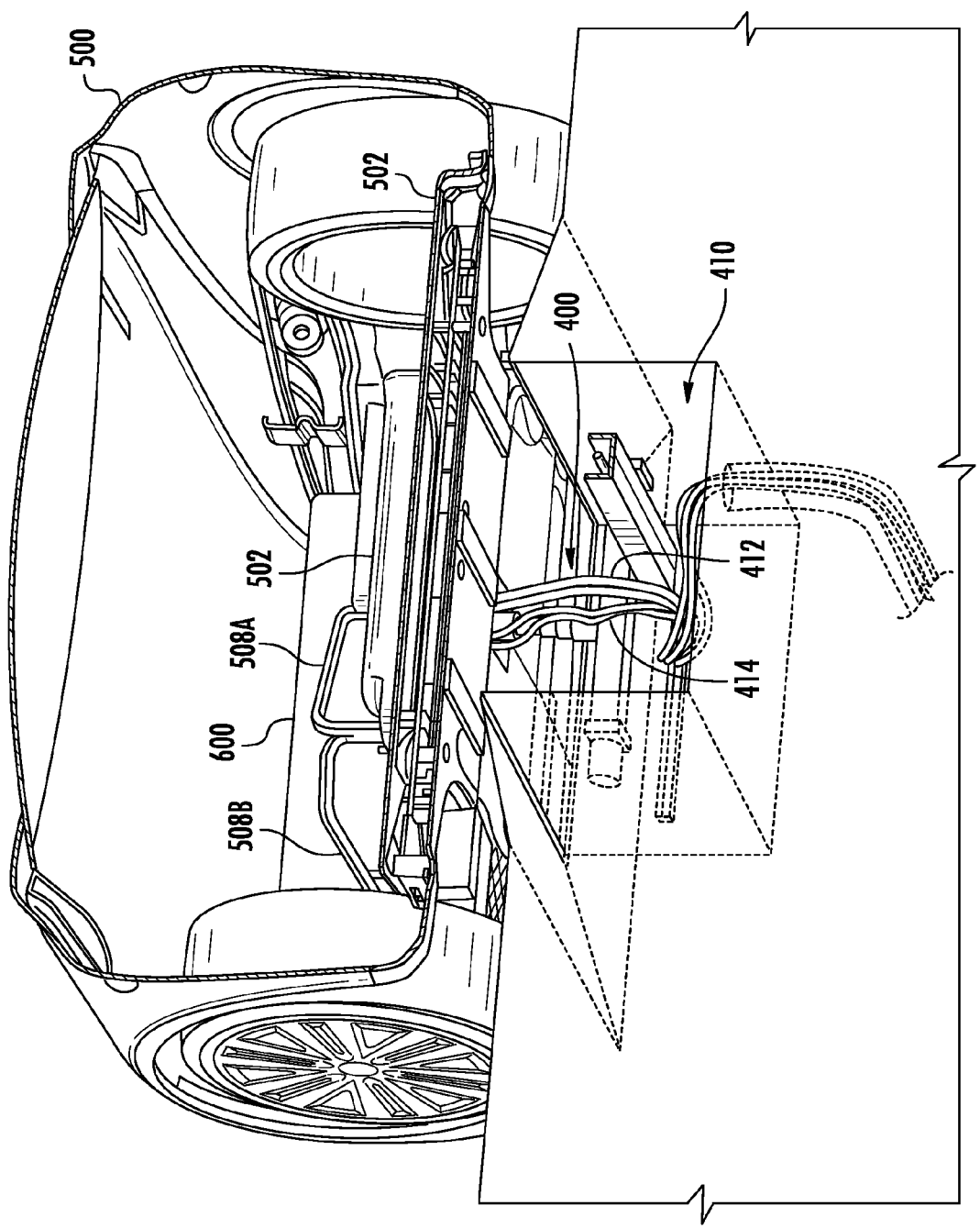
FIG. 6 shows another view of the arm in FIG. 5.

FIG. 6 shows another view of the arm 400 in FIG. 5. Here, the vehicle 500 is again shown in cross section, this time viewed toward the front from a position shortly behind the front wheels. The view shows how the well 410 is situated underneath where the vehicle is currently parked, so as to allow the arm to extend upward into the correct position. When the connection is properly coupled, the electrical lines 414 provide charging of the battery pack 502, whereas the fluid lines 412 provide thermal conditioning of the vehicle's internal coolant. The internal coolant, as has been mentioned, flows in an internal cooling system that includes a coolant line 508A that leads to the quick-disconnect coupling (e.g., with a liquid-to-liquid heat exchanger), and a coolant line 508B that connects a heat exchanger 600 to the internal cooling system. In some implementations, the heat exchanger 600 can be similar to the heat exchanger 214 (FIG. 2). For example, the heat exchanger can be a radiator, a condenser and/or a chiller.

Figure 7:
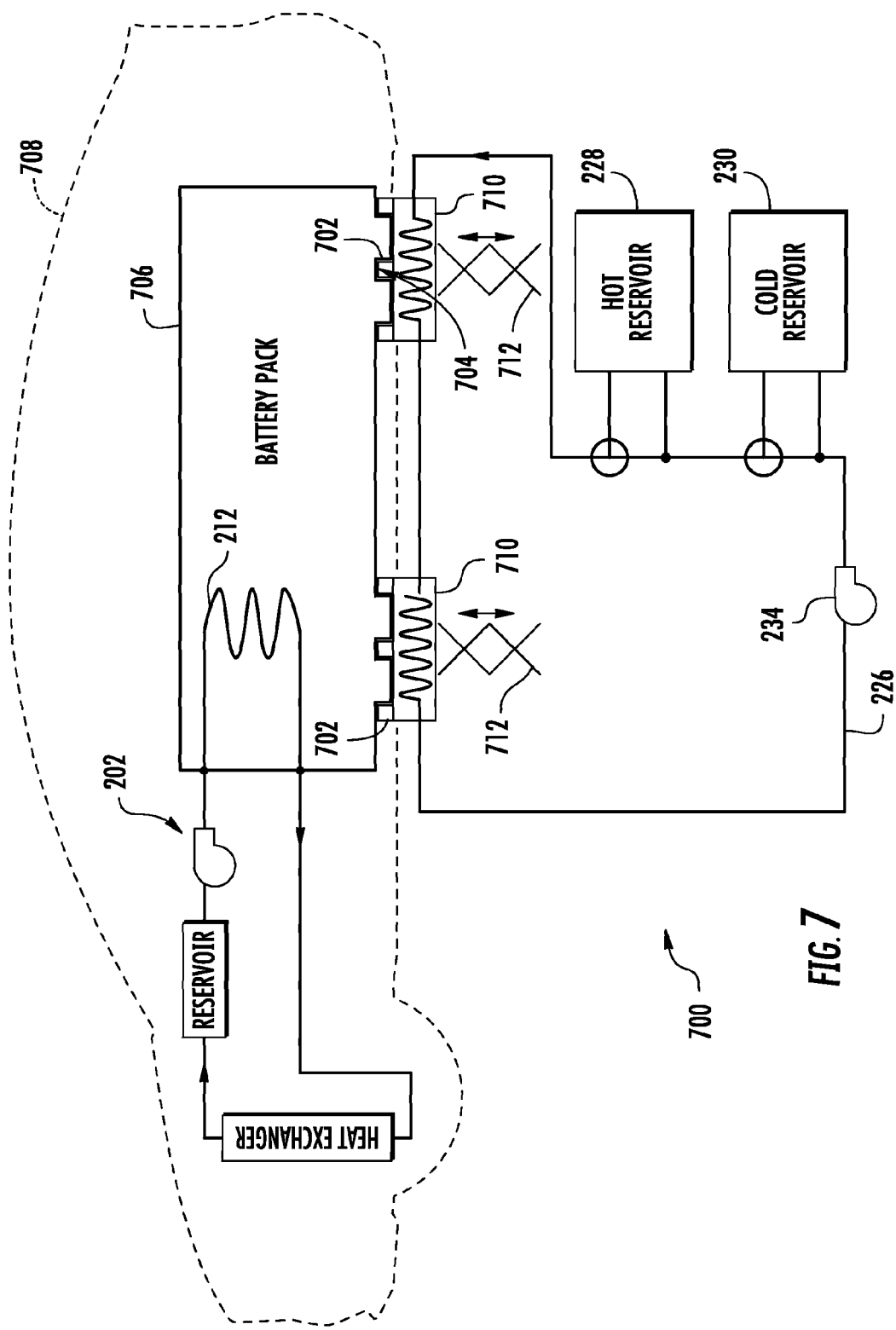
FIG. 7 schematically shows an external thermal conditioning system with thermal contactors configured to enter through openings in the enclosure of an energy storage system of an electric vehicle.

FIG. 7 schematically shows an external thermal conditioning system 700 with thermal contactors 702 configured to enter through openings 704 in the enclosure of an energy storage system 706 of an electric vehicle 708. For example, the energy storage system can include a battery pack with modules of lithium-ion cells. The system 700 can allow the thermal contactors to at least partially enter into the battery pack to provide thermal conditioning of key components therein, such as by thermal contact with the cooling tube 212 of the internal cooling system 202 in one or more strategic positions. For example, the opening can include a spring-loaded door that is pushed open by the thermal contactor, thereby allowing the thermal contactor access through the opening and into the interior of the battery pack. The battery pack interior can have one or more thermal plates allowing thermal exchange between the cells of the battery pack (e.g., through internal coolant) and the thermal contactors of the external cooling system.

The external thermal conditioning system 700 can be implemented at least partially underground. For example, the external system can be part of the underground system 310 (FIG. 3) and/or implemented inside the well 410 (FIG. 4).

The external thermal conditioning system 700 can include the reservoirs 228 and 230, the line 226 and the pump 234, substantially as previously described. In other implementations, another way of thermally conditioning the external coolant can also or instead be used, including, but not limited to, inline electric heating.

The external thermal conditioning system 700 is operated by a controller which is here omitted for clarity. In operation, the pump circulates fluid of an appropriate temperature (based on thermal information from the vehicle 708) through the line 226 and into conductive pads 710 from which the thermal contactors 702 extend. The conductive pads are configured to provide good thermal exchange between the coolant and the thermal contactors so as to allow the latter to withdraw heat from, or add it to, the energy storage system 706. For example, the conductive pads can be made from metal, or a composite or other synthetic material.

The conductive pads 710 can be actuated in at least a vertical direction by scissor lifts 712. For example, after the vehicle is correctly positioned, the scissor lifts can be activated to advance the conductive pads upward, thereby passing the thermal contactors through the openings 704 into their designated places. In other implementations, the conductive pads can be maneuvered by an actuated arm, such as the arm 400 shown in FIG. 4.

Figure 8:
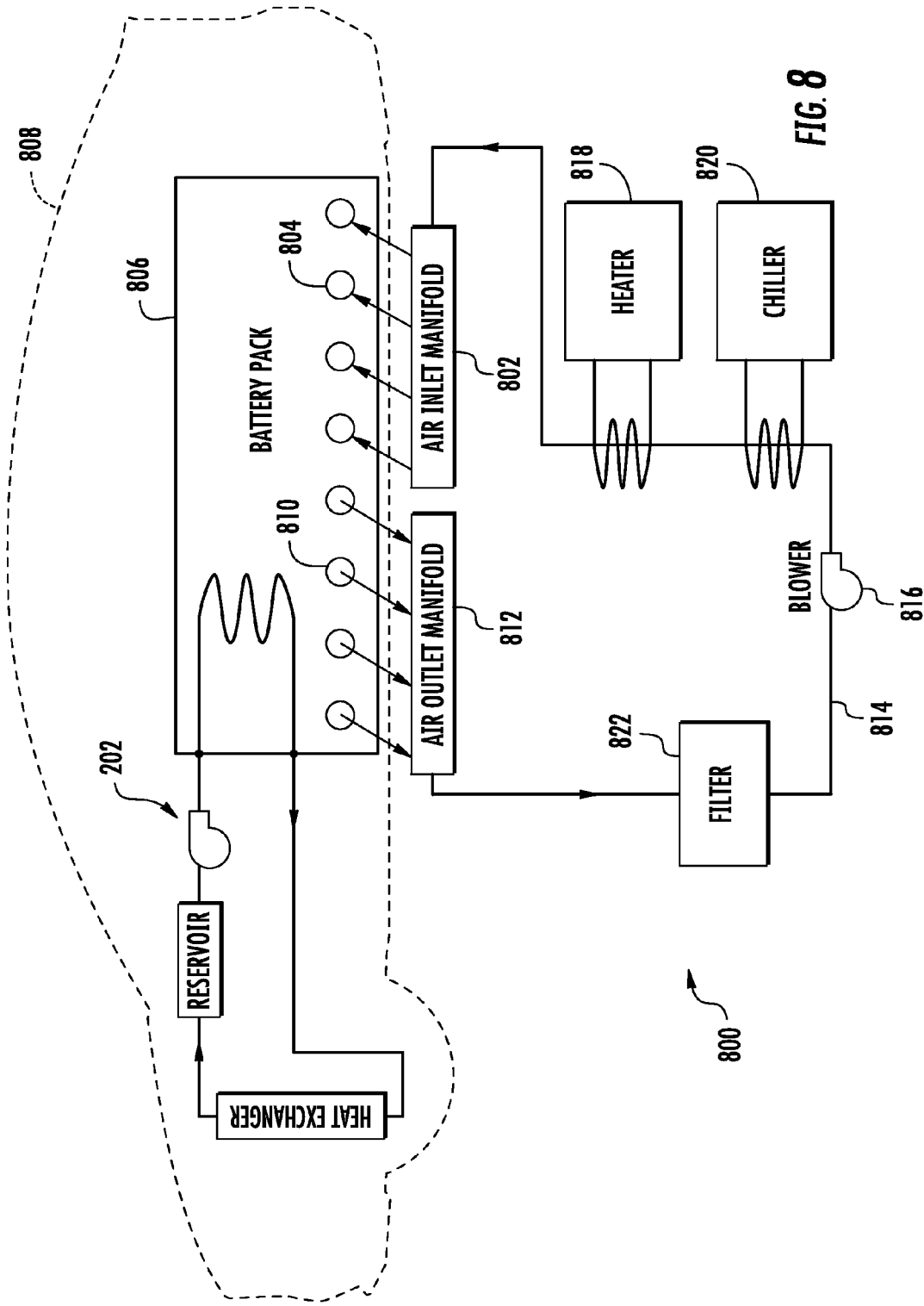
FIG. 8 schematically shows an external thermal conditioning system that couples an air inlet to an air intake in the enclosure of an energy storage system of an electric vehicle.

FIG. 8 schematically shows an external thermal conditioning system 800 that couples an air inlet 802 to an air intake 804 in the enclosure of an energy storage system 806 of an electric vehicle 808. That is, this system is based on providing a flow of air having an appropriate temperature (based on thermal information from the electric vehicle) and passing that air flow through at least part of the interior of the battery pack so as to thermally condition it. The return air can exit the battery pack through air outlets 810 and be captured by an air outlet 812.

The external thermal conditioning system 800 can be implemented at least partially underground. For example, the external system can be part of the underground system 310 (FIG. 3) and/or implemented inside the well 410 (FIG. 4). In some implementations, the air inlet 802 and the air outlet 812 can be maneuvered by an actuated arm, such as the arm 400 shown in FIG. 4.

The external thermal conditioning system 800 here has a tube 814 or other conduit through which air flows, driven by at least one blower 816. The air in the tube is brought to a proper temperature by being acted on by either a heater 818 or a chiller 820. For example, the external cooling system can receive thermal information (e.g., a specified temperature value) from the vehicle 808 can heat or cool the circulated air as needed. The circulating air is fed into the air inlet 802, which can have a manifold that distributes the air into multiple flows depending on the number of openings 804 on the battery pack. The pressure of air flowing into the battery pack can drive air out through the openings 810 and into the air outlet 812, which can have a manifold that joins multiple air flows into one. The openings 810 can have the same number and/or sizes as the openings 804. From the air outlet, the air can pass through a filter 822 to remove dust or other contaminants, and thereafter continue circulating in the tube 816. That is, the external cooling system 800 can supplement, or act in lieu of, the vehicle's internal cooling system 202, while the vehicle is at a charging station to be charged.

In other implementations, the air outlet 812 can be omitted, instead allowing the air leaving the battery pack to escape into the ambience. The filter 822 can then instead have an air inlet that draws in ambient air, with the blower 816 pushing that air past the running heater or chiller, as applicable, and then into the battery pack.

Figure 9:
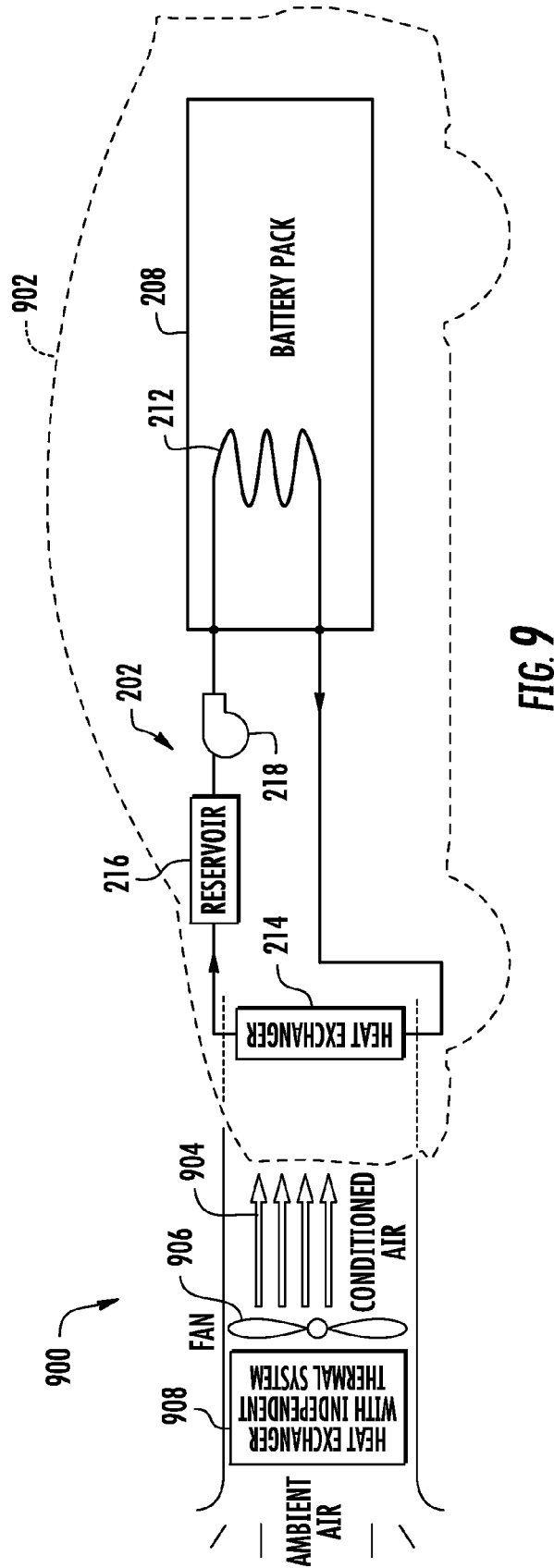
FIG. 9 schematically shows an external thermal conditioning system that directs conditioned air at one or more air-to-liquid heat exchangers of an electric vehicle.

FIG. 9 schematically shows an external thermal conditioning system 900 that directs conditioned air at one or more air-to-liquid heat exchangers of an electric vehicle 902. Here, the vehicle has the energy storage 208 (e.g., a battery pack), and the internal cooling system 202 feeds coolant through the cooling tube 212, the heat exchanger 214 and the reservoir 216 by way of the pump 218. In addition, the external cooling system is configured to flow conditioned air 904 toward the heat exchanger 214 by way of a fan 906, the air having been conditioned by a component 908 in the external system. In some implementations, the component 908 includes a heat exchanger and a thermal system that together provide conditioned air at a suitable rate and temperature (e.g., chilled air). For example, the external cooling system can receive a communication from the vehicle with thermal information about the battery pack, and the component 908 can then condition ambient air as necessary (e.g., by cooling it). That is, blowing conditioned air toward the vehicle's internal heat exchanger 214 during a charging session supplements the internal cooling system 202 in maintaining proper temperature of the battery pack.

Figure 10:
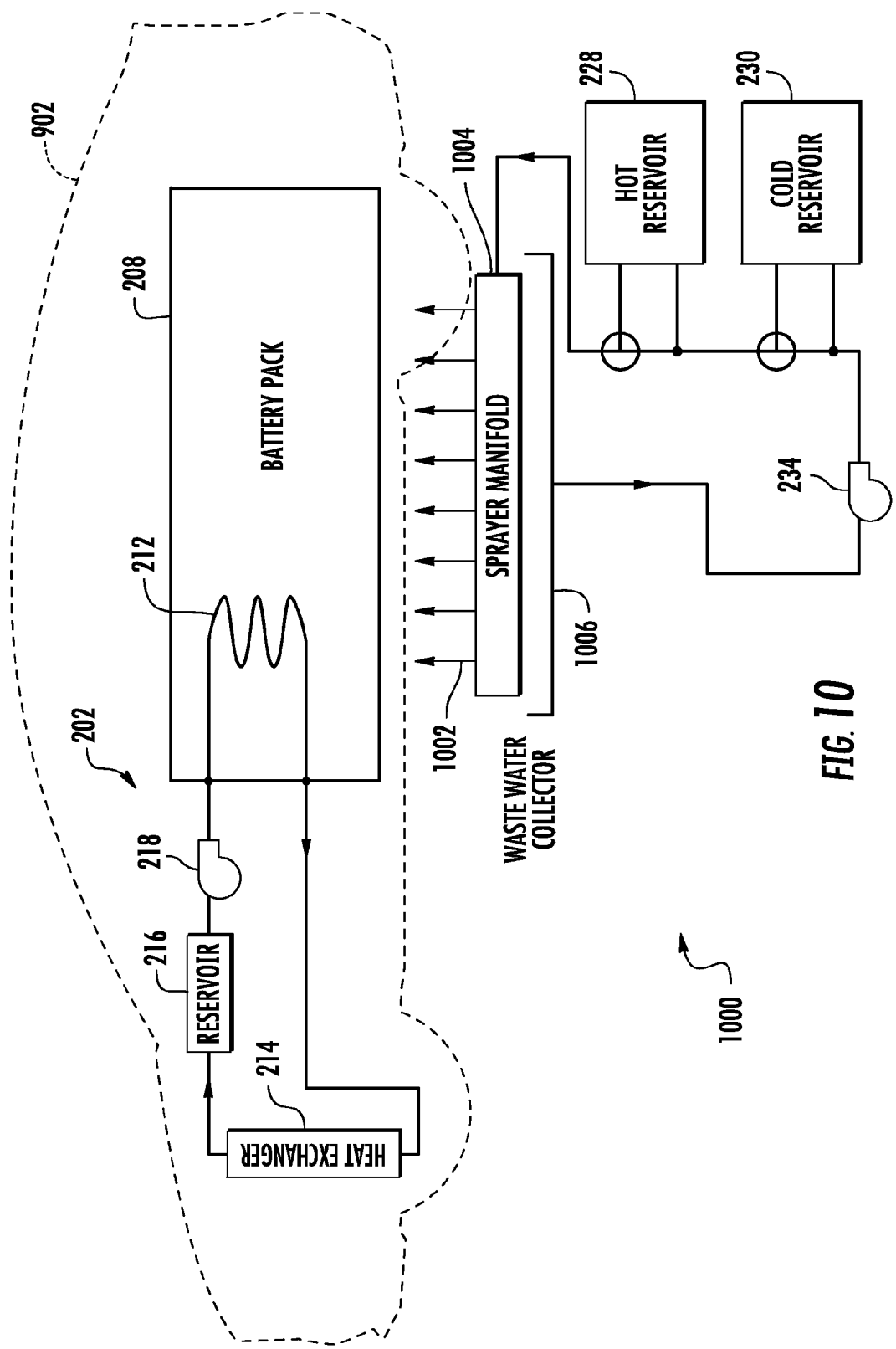
FIG. 10 schematically shows another external thermal conditioning system that directs conditioned liquid jets at the electric vehicle.

FIG. 10 schematically shows another external thermal conditioning system 1000 that directs conditioned liquid jets 1002 at the electric vehicle 902. This can be done based on thermal information provided by the vehicle to the external system, for example so that cold liquid (e.g., water) or hot liquid is selected as applicable. Similar to previous examples, the vehicle has the internal cooling system 202 which feeds coolant through the cooling tube 212, the heat exchanger 214 and the reservoir 216 by way of the pump 218. Moreover, spraying the vehicle's energy storage 208 with liquid during a charging session supplements the internal cooling system 202 in maintaining proper temperature of the battery pack.

The external thermal conditioning system 1000 uses the pump 234 to force coolant drawn from the hot reservoir 228 and/or the cold reservoir 230 into a sprayer manifold 1004 configured to direct an array of the jets 1002 toward the underside of the energy storage 208. In other implementations, another way of thermally conditioning the external coolant can also or instead be used, including, but not limited to, inline electric heating.

In some implementations, the sprayer manifold can be moved during while spraying coolant onto the battery pack, for example so as to direct the jets 1002 at different areas of the battery pack. The sprayer manifold can be as wide as, or narrower than, the battery pack. The sprayer manifold can be as long as, or shorter than, the battery pack.

A waste water collector 1006 can be positioned underneath the battery pack so as to collect the sprayed coolant. For example, the coolant can be filtered before being recirculated in the external thermal conditioning system.

The external thermal conditioning system 1000 can be implemented at least partially underground. For example, the external system can be part of the underground system 310 (FIG. 3) and/or implemented inside the well 410 (FIG. 4). In some implementations, the sprayer manifold 1004 and the waste water collector 1006 can be maneuvered by an actuated arm, such as the arm 400 shown in FIG. 4.

In other implementations, the jets 1002 can also or instead be directed at another component of the vehicle. For example, the jet can be directed at a heat exchanger (e.g., a radiator, condenser, and/or cold plate) that is part of an internal cooling system of the vehicle.

Figure 11:
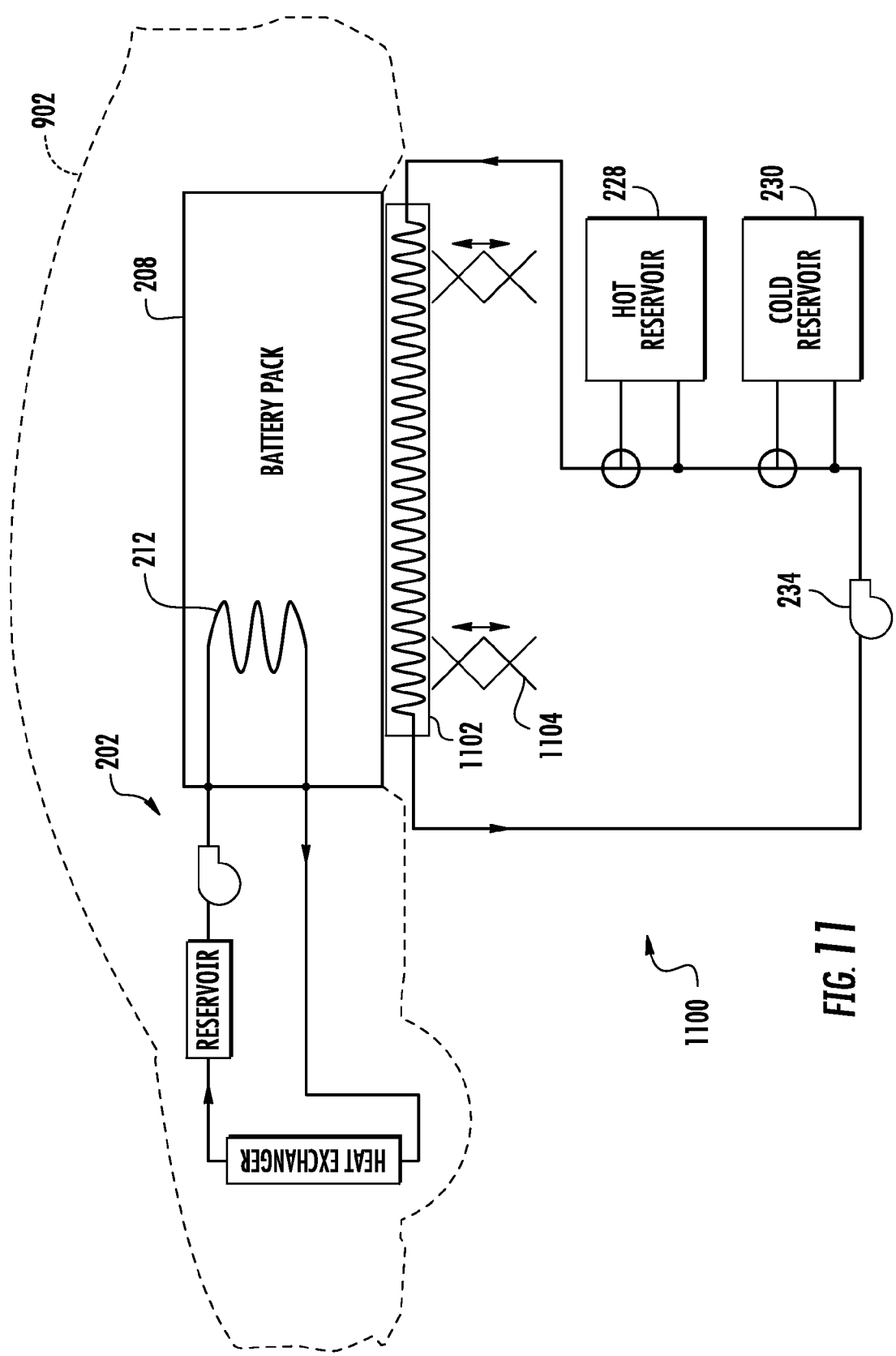
FIG. 11 schematically shows an external thermal conditioning system that contacts the energy storage of the electric vehicle with a conductive pad.

FIG. 11 schematically shows an external thermal conditioning system 1100 that contacts the energy storage 208 of the electric vehicle 902 with a conductive pad 1102. Similar to previous examples, this can be done based on thermal information provided by the vehicle to the external system, so as to supplement the internal cooling system 202 in maintaining proper temperature of the battery pack.

The external thermal conditioning system 1100 vertically positions the conductive pad 1102 using one or more scissor lifts 1104. The external thermal conditioning system 1100 uses the pump 234 to force coolant drawn from the hot reservoir 228 and/or the cold reservoir 230 into the conductive pad, which is configured to contact the underside of the energy storage 208 (e.g., a base plate that forms the bottom of the battery pack). In other implementations, another way of thermally conditioning the external coolant can also or instead be used, including, but not limited to, inline electric heating.

The physical pressure between the conductive pad 1102 and the energy storage 208 will be maintained at an appropriate level. For example, the pressure must not be so high that the conductive pad damages the outer casing of the battery pack. The conductive pad can be as wide as, or narrower than, the battery pack. The conductive pad can be as long as, or shorter than, the battery pack.

The external thermal conditioning system 1100 can be implemented at least partially underground. For example, the external system can be part of the underground system 310 (FIG. 3) and/or implemented inside the well 410 (FIG. 4). In some implementations, the conductive pad 1102 can be maneuvered by an actuated arm, such as the arm 400 shown in FIG. 4.

Figure 12:
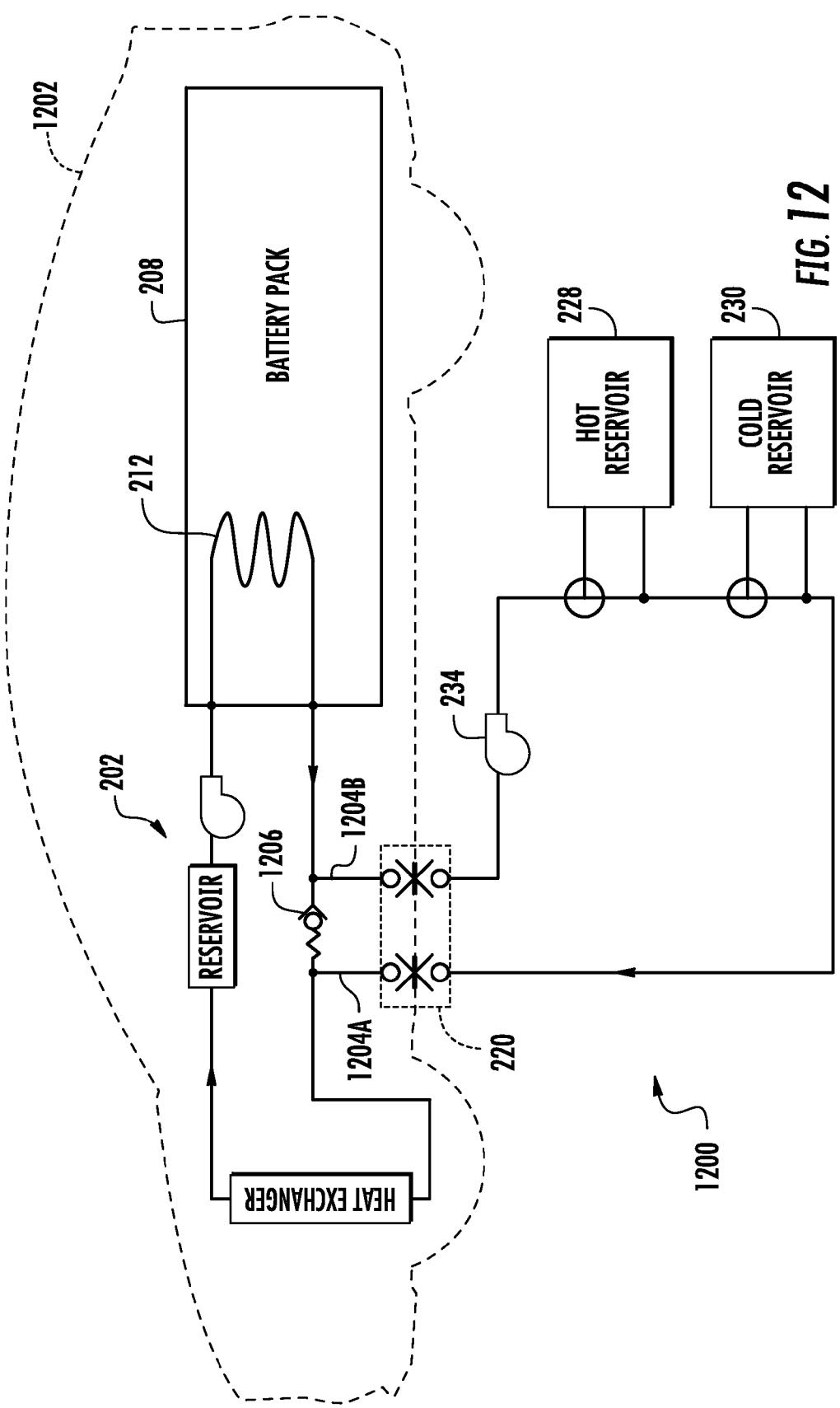
FIG. 12 schematically shows an external thermal conditioning system that exchanges thermal fluid with an electric vehicle during a charging session.

FIG. 12 schematically shows an external thermal conditioning system 1200 that exchanges thermal fluid with an electric vehicle 1202 during a charging session. That is, the system 1200 can in some regards be similar to the system 200 shown in FIG. 2, except that the system 1200 does tap into the coolant flow of the internal cooling system. The system 1200 can do so in response to thermal information (e.g., a specified temperature value) provided by the vehicle (e.g., a signal from an onboard battery management system).

The external thermal conditioning system 1200 uses the pump 234 to circulate coolant in the line 226, including to and from the connector 220. Here, the coolant is drawn from the hot reservoir 228 and/or the cold reservoir 230. In other implementations, another way of thermally conditioning the external coolant can also or instead be used, including, but not limited to, inline electric heating.

Inside the vehicle 1202, an inlet 1204A of the cooling tube 212 receives the coolant from the connector 220 (i.e., from the external system 1200) and allows it to enter the internal cooling system 202. A corresponding outlet 1204B of the cooling tube 212 allows coolant to flow out of the internal cooling system and into the external system. The internal cooling system 202 can have a check-valve 1206 to stop reversed coolant flow in the cooling tube 212.

The external thermal conditioning system 1200 can be implemented at least partially underground. For example, the external system can be part of the underground system 310 (FIG. 3) and/or implemented inside the well 410 (FIG. 4). In some implementations, the connector 220 can be maneuvered by an actuated arm, such as the arm 400 shown in FIG. 4.

Figure 13A:
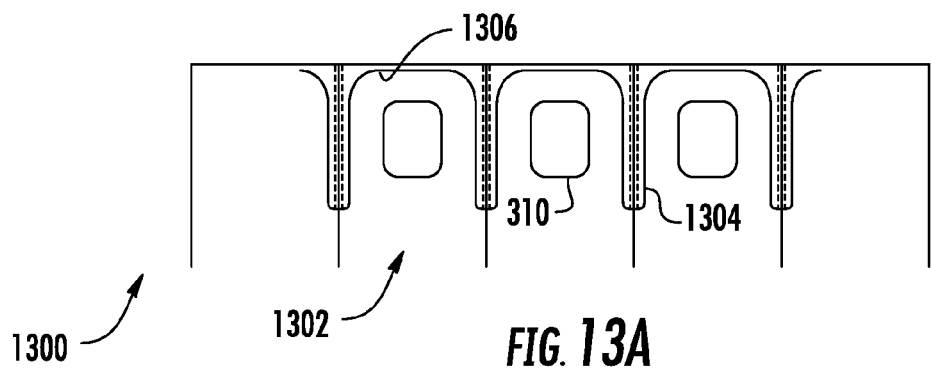
FIG. 13A shows an example of a charging station where charging spots have contoured vehicle guides.

FIG. 13A shows an example of a charging station 1300 where charging spots 1302 have contoured vehicle guides 1304. Each of the charging spots 1302 can be a dedicated parking space for use by electric vehicles and is therefore provided with the underground system 310.

The contoured vehicle guides 1304 can help properly position the vehicle above the underground system 310. The contoured vehicle guides are raised above the ground surface and have a funnel shape that directs the vehicle into the correct position and indicates where to stop. For example, the vehicle guides on the respective sides of the charging spot can each have a curve 1306 that provides rolling resistance for the vehicle's front wheels if the vehicle is off to one side, or when the vehicle has pulled sufficiently far into the spot. The contoured vehicle guides can be made from any material of sufficient durability against the wear of vehicle wheels and the exposure to weather. For example, concrete can be used.

Figure 13B:
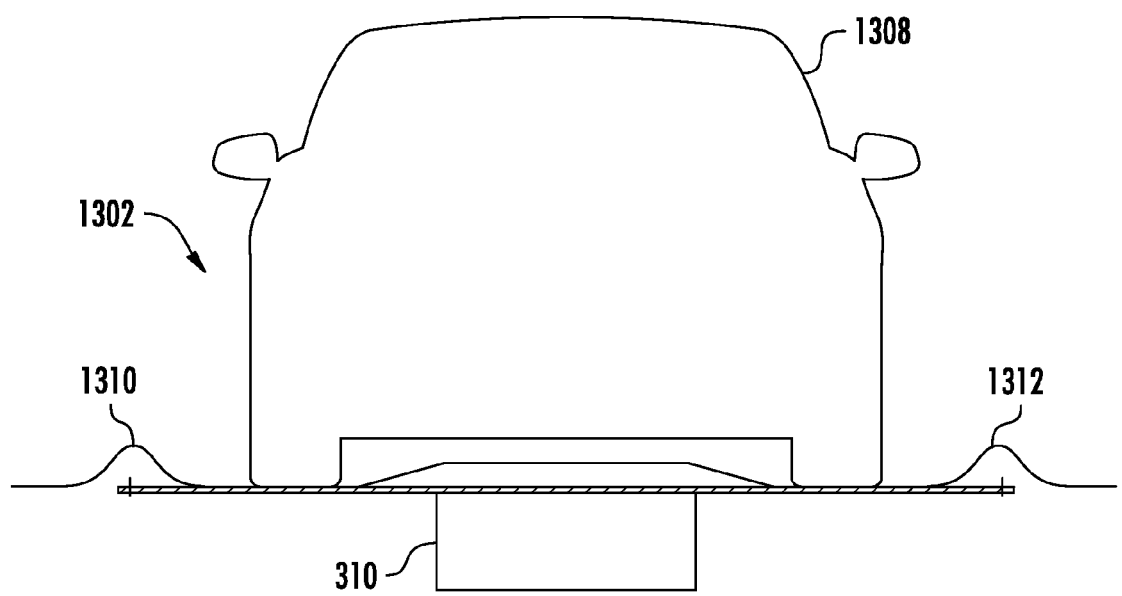
FIG. 13B shows a partial cross section of the view in FIG. 13A.

FIG. 13B shows a partial cross section of the view in FIG. 13A. Here, a vehicle has been parked above the underground system 310 in a particular one of the charging spots 1302. On either side, the spot has a contoured vehicle guide 1310, 1312 that helps guide the vehicle into position. For example, the vehicle guide can have gradually sloping surfaces so that the driver does not accidentally place the vehicle out of alignment with the underground system. Each contoured vehicle guide can have a surface facing one of the charging spots on one of its sides, and a surface facing an adjacent one of the spots on its other side.

A number of implementations have been described as examples. Nevertheless, other implementations are covered by the following claims.

What is claimed is:

1. A method of thermally conditioning an energy storage of a vehicle while charging, the method comprising:
   receiving, at a charging station, thermal information about the energy storage from the vehicle while charging, the thermal information including a requested temperature of thermal conditioning;
   supplying, by the charging station, electric energy to the energy storage in a charging session; and
   providing, by the charging station and based on the thermal information, thermal conditioning of the energy storage during at least part of the charging session.

2. The method of claim 1, further comprising actuating an arm so that an electric connector and a fluid connector mounted thereon make contact with the vehicle, wherein the electric energy is supplied to the energy storage through the electric connector, and wherein the thermal conditioning of the energy storage is provided through the fluid connector.

3. The method of claim 2, wherein actuating the arm comprises guiding the arm to a position underneath the vehicle.

4. The method of claim 2, wherein actuating the arm comprises coupling the electric connector to an electric port on the vehicle, and coupling the fluid connector to a fluid port on the vehicle.

5. The method of claim 4, wherein coupling the fluid connector to the fluid port comprises coupling the fluid connector to a thermal system of the vehicle, the method further comprising providing, by the charging station and to the thermal system, a first liquid through the fluid connector, and extracting, by the charging station, a second liquid from the thermal system.

6. The method of claim 1, further comprising actuating an arm so that a thermal contactor mounted thereon enters through an opening in the energy storage and contacts a thermal exchange plate inside the energy storage.

7. The method of claim 1, further comprising actuating an arm so that an air inlet couples with an air intake on the energy storage, wherein providing the thermal conditioning comprises feeding air into the energy storage through the air intake.

8. The method of claim 1, wherein providing the thermal conditioning comprises directing one or more conditioned jets of fluid at the vehicle.

9. The method of claim 1, further comprising selecting a thermal mode from at least a cooling mode and a heating mode based on the thermal information, wherein the thermal conditioning corresponds to the selected thermal mode.

10. The method of claim 9, wherein the thermal information comprises a temperature value specified by the energy storage, and wherein the thermal mode is selected according to the temperature value.

11. The method of claim 10, wherein the temperature value reflects a fluid temperature requested by the energy storage, and wherein providing the thermal conditioning comprises supplying fluid having the requested fluid temperature to the vehicle.

12. The method of claim 1, wherein providing the thermal conditioning comprises contacting the energy storage with a conductive pad during the charging session, and circulating a fluid through the conductive pad.

13. The method of claim 1, further comprising guiding the vehicle into position at the charging station using at least one contoured vehicle guide on a ground surface.

14. A system comprising:
    charging equipment configured to supply electric energy in a charging session to an energy storage of a vehicle;
    means for receiving, from the vehicle, thermal information about the energy storage of the vehicle in the charging session that includes a requested temperature of thermal conditioning; and
    means for providing, based on thermal information about the energy storage received from the vehicle, thermal conditioning of the energy storage during at least part of the charging session.

15. The system of claim 14, further comprising an actuated arm that the means maneuvers to provide the thermal conditioning.

16. The system of claim 15, wherein the arm is configured to be maneuvered under the vehicle for the charging session.

17. The system of claim 15, wherein the arm has an electric connector and a fluid connector mounted thereon, the electric connector configured to couple to an electric port on the vehicle, the fluid connector configured to couple to a fluid port on the vehicle, wherein the charging equipment supplies the electric energy to the energy storage through the electric connector, and wherein the means provides the thermal conditioning of the energy storage through the fluid connector.

18. The system of claim 15, further comprising at least one reservoir with a fluid, wherein the means draws from the reservoir to provide the thermal conditioning.

19. The system of claim 18, having a first reservoir with heated liquid and a second reservoir with a cooled liquid, and respective valves coupled to the first and second reservoirs, wherein the means draws an amount of liquid from at least one of the first and second reservoirs according to the thermal information to provide the thermal conditioning.

* * * * *